US007532621B2

(12) United States Patent
Birman et al.

(10) Patent No.: US 7,532,621 B2
(45) Date of Patent: May 12, 2009

(54) LATERAL ERROR CORRECTION FOR TIME-CRITICAL MULTICAST

(75) Inventors: Kenneth Paul Birman, Ithaca, NY (US); Mahesh Balakrishnan, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 427 days.

(21) Appl. No.: 11/513,006

(22) Filed: Aug. 30, 2006

(65) Prior Publication Data

US 2008/0056255 A1    Mar. 6, 2008

(51) Int. Cl.
*H04L 12/28*      (2006.01)
(52) U.S. Cl. .................. 370/389; 370/432; 714/746
(58) Field of Classification Search .................. None
See application file for complete search history.

(56) References Cited

U.S. PATENT DOCUMENTS

| 6,278,716 | B1 * | 8/2001 | Rubenstein et al. ......... 370/432 |
| 6,501,763 | B1 * | 12/2002 | Bhagavath et al. .......... 370/432 |
| 6,539,022 | B1 * | 3/2003 | Virgile ...................... 370/401 |
| 6,693,907 | B1 * | 2/2004 | Wesley et al. ............... 370/390 |
| 2004/0071128 | A1 * | 4/2004 | Jang et al. ................... 370/349 |

* cited by examiner

*Primary Examiner*—Bob A Phunkulh
(74) *Attorney, Agent, or Firm*—Burns & Levinson LLP; Jacob N. Erlich, Esq.; Kathleen Chapman, Esq.

(57) ABSTRACT

A system and method for providing a low-latency reliable multicast protocol designed for time-critical clustered applications. Internet Protocol (IP) multicast is used to transmit data and recovers from packet loss in end-hosts using a repair mechanism involving the exchange of XOR repairs between receivers and across groups. The system and method of the present invention can be embodied in a scalable, reliable and fast multicast primitive that can be layered under high-level abstractions such as publish-subscribe, group communication and replicated service/object infrastructures.

23 Claims, 9 Drawing Sheets $$c_A^x = |x|/|A| * c_A$$

LATERAL ERROR CORRECTION FOR TIME-CRITICAL MULTICAST

STATEMENT OF GOVERNMENT INTEREST

This invention was made with United States Government support from DARPA, AFRL, AFOSR, NSF under contract numbers SRS-FA8750-04-2-0011, FA8750-05-2-0128, F49620-02-1-0233, and 0435190, respectively. The United States Government has certain rights in the invention.

BACKGROUND OF THE INVENTION

Clusters and datacenters play an increasingly important role in the contemporary computing spectrum, providing back-end computing and storage for a wide range of applications. The modern datacenter is typically composed of hundreds to thousands of inexpensive commodity blade-servers, networked via fast, dedicated interconnects. The software stack running on a single blade-server is a combination of off-the-shelf software: commercial operating systems, proprietary middleware, managed run-time environments and virtual machines, all standardized to reduce complexity and mitigate maintenance costs. For many purposes, rapid response to events is critical. Computer programs with this property are commonly referred to as time critical computing applications. A time-critical computing application is said to be scalable if it is able to execute on clusters of commodity servers, so that when more load rises, additional computing nodes can easily be assigned to the application. Applications in domains ranging from computational finance to air-traffic control and military communication are under growing pressure to migrate from traditional single-node computer platforms to commodity clusters to take advantage of scalability. However, when requirements of timely responsiveness, massive scalability and "multiple nines" of availability are combined, they result in extremely complex application designs. What is needed is a time-critical communications paradigm that greatly simplifies the development of these scalable, fault-tolerant, time-critical applications to produce time-critical applications that can scale to hundreds of nodes, can support fault-tolerance and high availability, and can exploit modern "distributed object architectures" that provide programmers with easy-to-use abstractions.

What is needed is a multicast protocol based on a realistic datacenter loss model reflecting significant frequency of short bursts of packets being dropped at the end-host receivers, with specific loss rates that can be measured for a given target cluster. The protocol must also make use of the fact that the critical dimension of scalability in time-critical fault-tolerant settings is the number of groups in the system. The resulting reliable multicast protocol should also be designed to perform well even when each node belongs to a great many low-rate multicast groups. Finally, the protocol should be one that can be at the application-level, requiring no router modification or operating system changes, so that applications can run on standard datacenter hardware and execute on any mix of existing commodity routers and operating systems software. Given a protocol that has these properties, a further goal is to achieve packet loss recovery latency dependent on the rate of data incoming at a node across all groups, i.e. recovery of packets should occur as quickly in many groups as in a single group, allowing applications to divide node bandwidth among many multicast groups while maintaining time-critical packet recovery.

SUMMARY OF THE INVENTION

The needs set forth above as well as further and other needs and advantages are addressed by the present invention. The solutions and advantages of the present invention are achieved by the illustrative embodiment described herein below.

The method of the present invention enables management of packet loss in a communications network. The method can include, but is not limited to, the step of determining all the multicast groups to which a selected node belongs. The method can further include the steps of determining a first subset of nodes that are members of at least one of the multicast groups to which the selected node belongs, and determining at least one second subset that includes the selected node and nodes from the first subset that share all the multicast groups with each other. The method can still further include the steps of determining a number of repair packets sent per communications packets received for the multicast group, and computing at least one representative number that corresponds to the second subset. The method can even still further include the steps of assigning the at least one representative number to each of the second subsets, and preparing and sending repair packets, to enable management of packet loss, where the step of preparing and sending the repair packets is based on the number of repair packets, the at least one representative number, and the communications packets received by the selected node.

The system of the present invention manages communications packet loss in a communications network. The system can include, but is not limited to, a setup subsystem that can determine framework parameters, for example, the number of repair packets associated with a selected node that is a member of at least one multicast group. The system can further include a packet processor that can receive communications packets into the selected node when the communications packets are addressed to the multicast group to which the selected node belongs. The system can even further include a repair packet creator that can prepare a repair packet that includes the received communications packet, and an integral value subsystem that can use the framework parameters to select an amount of nodes to which the repair packet is sent. The system can even still further include a random node selector that can randomly select the nodes from the multicast group to which said repair packet is sent, and a repair packet sender that can send the repair packet to the randomly selected amount of nodes.

For a better understanding of the present invention, together with other and further objects thereof, reference is made to the accompanying drawings and detailed description. The scope of the present invention is pointed out in the appended claims.

DETAILED DESCRIPTION OF THE INVENTION

Figure 1:
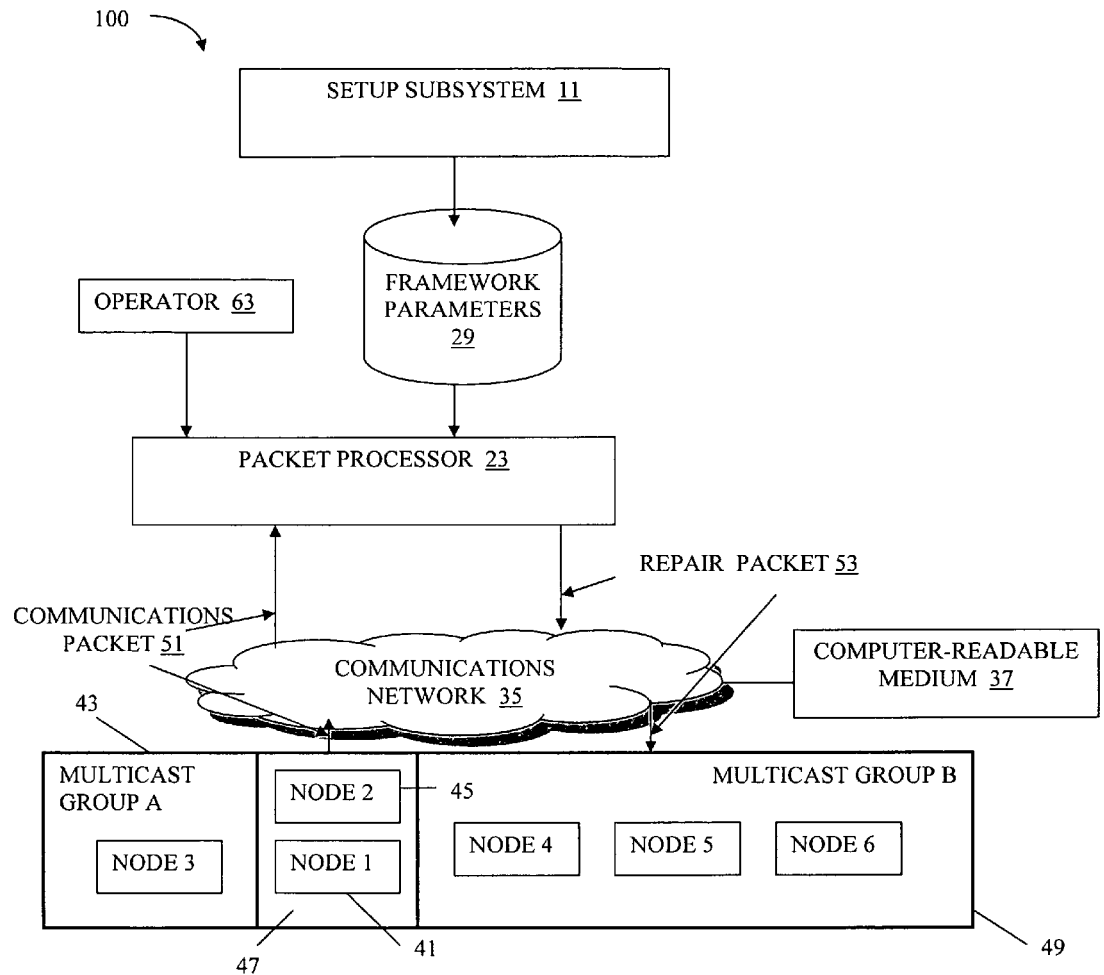
FIG. 1 is a schematic block diagram of the system of the present invention for managing communications packet loss in a communications network.

The present invention is now described more fully hereinafter with reference to the accompanying drawings, in which the illustrative embodiment of the present invention is shown. The following configuration description is presented for illustrative purposes only. Any computer configuration satisfying the speed and interface requirements herein described may be suitable for implementing the system of the present invention.

In recent years, multicast research has focused almost exclusively on application-level routing mechanisms, or overlay networks, designed to operate in the wide-area without any existing router support. The need for overlay multicast stems from the lack of IP multicast coverage in the modern internet, which in turn reflects concerns of administration complexity, scalability, and the risk of multicast 'storms' caused by misbehaving nodes. However, the homogeneity and comparatively limited size of datacenter networks pose few scalability and administration challenges to IP multicast, making it a viable and attractive option in such settings.

"Reliable multicast", as used herein, is a reliability layer over IP multicast. Reliable multicast protocols typically consist of three logical phases: transmission of the packet, discovery of packet loss, and recovery from it. After a node knows it is missing a packet, recovering it involves retrieving the packet from some other node. However, in most existing scalable multicast protocols, the time taken to discover packet loss dominates recovery latency heavily in certain configurations. The discovery latency of reliable multicast protocols is usually inversely dependent on data rate, i.e. for existing protocols, the rate of outgoing data at a single sender in a single group.

Existing schemes for reliability in multicast can be roughly divided into the following categories.

(1) Acknowledgement (ACK)/timeout, for example RMTP and RMTP-II, in which receivers send ACKs to the sender of the multicast upon receipt of a communications packet from the sender. This is the trivial extension of unicast reliability to multicast, and is intrinsically unscalable due to ACK implosion which means that, for each sent message, the sender has to process an ACK from every receiver in the group. ACK aggregation allows ACK/timeout to scale in the number of receivers but requires the construction of a tree for every sender to a group. Also, any aggregative mechanism introduces latency, leading to larger time-outs at the sender and delaying loss discovery. Hence, ACK aggregation is unsuitable in time-critical settings.

(2) Gossip-based, for example, Bimodal Multicast and lpbcast. In group-based, receivers periodically gossip histories of received packets with each other. Upon receiving a digest, a receiver compares the contents with its own packet history, sending any packets that are missing from the gossiped history and requesting transmission of any packets missing from its own history. Gossip-based schemes can offer scalability in the number of receivers per group, and extreme resilience by diffusing the responsibility of ensuring reliability for each packet over the entire set of receivers. However, they are not designed for time-critical settings because discovery latency is equal to the time period between gossip exchanges which can be a significant number of milliseconds, for example, 100 ms in Bimodal Multicast. Further, recovery can involve an additional one or two-phase interaction as the affected node obtains the packet from its gossip contact. Thus Bimodal Multicast is bimodal in several senses, i.e. delivery probability (the origin of the protocol name) and delivery latency, and a loss can result in delays of several hundred milliseconds.

(3) Negative acknowledgment (NAK)/sender-based sequencing, for example, SRM. In NAK/sender-based sequencing, senders number outgoing multicasts, and receivers discover packet loss when a subsequent message arrives. Loss discovery latency is thus proportional to the inter-send time at any single sender to a single group. In NAK/sender-based sequencing, a receiver can't discover a loss in a group until it receives the next packet from the same sender to that group, and consequently depends on the sender's data transmission rate to the group. The result is that as the number of groups each node is a member of is increased, when the throughput in the system kept constant by reducing the data rate within each group, discovery latency of lost packets degrades linearly as each node's bandwidth is increasingly fragmented, and each group's rate goes down, increasing the time between two consecutive sends by a sender to the same group. When lost packets are discovered, lost packet recovery can be initiated by the receiver, which uses IP multicast (with a suitable TTL value), and the sender (or some other receiver), responds with a retransmission, also using IP multicast.

(4) Sender-based Forward Error Correction (FEC) schemes involve multicasting redundant error correction information along with data packets, so that receivers can recover lost packets without contacting the sender or any other node. FEC mechanisms involve generating c repair packets for every r data packets, such that any r of the combined set of r+c data and repair packets is sufficient to recover the original r data packets. "Rate-of-fire" is a term used to describe the (r, c) parameter. FEC mechanisms have the benefit of tunability, which is providing a coherent relationship between overhead and timeliness, i.e. the more repair packets generated, the higher the probability of recovering lost packets from the FEC data. Further, FEC based protocols are stable under stress, since recovery does not induce large degrees of extra traffic. As in NAK protocols, the timeliness of FEC recovery depends on the data transmission rate of a single sender in a single group, i.e. the sender can send a repair packet to a group only after sending out r data packets to that group. Traditionally, sender-based FEC schemes tend to use complex encoding algorithms to obtain multiple repair packets, placing computational load on the sender. However, faster encodings have been proposed recently, such as Tornado codes, which make sender-based FEC a very attractive option in multicast applications involving a single, dedicated sender; for example, software distribution or internet radio.

(5) Receiver-based FEC provides receivers generating FEC packets from incoming data and exchanging these FEC packets with other randomly chosen receivers. In comparison to the above-described mechanisms, ACK-based protocols are intrinsically unsuited for time-critical multi-sender settings, while sender-based sequencing and FEC limit discovery time to inter-send time at a single sender within a single group. Ideally, discovery time should be independent of inter-send time, and the scalability of a gossip-based scheme could optimally be combined with the tunability of FEC. Since FEC packets are generated from incoming data at a receiver, the timeliness of loss recovery depends on the rate of data multicast in the entire group, rather than the rate at any given sender, allowing scalability in the number of senders to the group.

The present invention relates to the role of many-to-many communication, or multicast in clustered time-critical computing applications. Multicast communication can be used to build software systems that must scale and tolerate failures. For example, commercial publish-subscribe (pub-sub) systems deliver published data to subscribers using per-topic multicast groups. Multicast can also be used in service and object architectures to update replicated entities and query them redundantly. It is a fundamental building block in higher level distributed protocols that provide ordering and consistency guarantees. Multicast as an abstraction is ubiquitous in clustered settings; hence, it is critical that the technology implementing it be reliable—masking communication faults quickly and inexpensively—and scalable. When used in a time-critical application, multicast should exhibit time-critical delivery properties.

Existing multicast protocols were primarily designed to extend the reach of multicast to massive networks, and may be unstable, inefficient and ineffective when retrofitted to clustered settings. They are not optimized for the failure modes of clusters and, most importantly, are unable to cope with the unique scalability demands of time-critical fault-tolerant applications.

In the present invention, a multicast protocol is optimized by taking advantage of the properties of a target environment. An optimized protocol might also include mechanisms designed to overcome problems that are more common in a target setting than they would be in the general Internet. In particular, datacenter networks have flat routing structures with no more than two or three hops on any end-to-end path. They are typically over-provisioned and of high quality, and packet loss in the network is almost non-existent. In contrast, datacenter end-hosts are inexpensive and easily overloaded; even with high-capacity network interfaces, the commodity operating system often drops packets due to buffer overflows caused by temporary traffic spikes or high-priority threads occupying the CPU. The present invention provides for a new time-critical multicast protocol optimized for datacenter communication networks and for the types of packet loss that arise in datacenter computer platforms.

The present invention also provides for the situation when multiple applications exploit the multicast communication protocol and create large numbers of potentially overlapping multicast groups. Multi-group systems can be expected to exhibit intrinsically bursty incoming traffic—each node in the system is receiving data from multiple senders in multiple groups and the inter-arrival time of data packets at a node can vary widely, even if the traffic rate at one sender or group is steady. In some cases, burstiness of traffic could also occur due to time-critical application behavior—for example, an update in the value of a stock quote can trigger off activity in several system components, which can then multicast information to a replicated central component. If each time-critical component processes the update within a few hundred microseconds, and if inter-node socket-to-socket latency is around fifty microseconds, the final central component could easily see a sub-millisecond burst of traffic. In this case, the componentized structure of the application can result in bursty traffic; in other scenarios, the application domain could be intrinsically prone to bursty input. For example, a financial calculator tracking a set of a hundred equities with correlated movements might expect to receive a burst of a hundred packets in multiple groups almost instantaneously.

The present invention teaches a system and method for receiver-generated FEC that probabilistically combines receiver-generated repair traffic across multiple groups to drive down packet recovery latencies. The system and method of the present invention enable building a time-critical reliable multicast protocol designed to perform well in the multicast patterns induced by clustered applications. All the paradigms of distributed system-building mentioned above use multicast in ways that induce large numbers of overlapping groups of nodes. For example, a computational finance calculator that uses a topic-based pub-sub system to subscribe to a fraction of the equities on the stock market will end up belonging in many multicast groups. Multiple applications within a datacenter—each subscribing to different sets of equities—can result in arbitrary patterns of group overlap. Similarly, entity (object or service) replication at fine granularity can result in a single node hosting many different replicated entities. Replication driven by high-level objectives such as locality, load-balancing or fault-tolerance can lead to distinct and overlapping replica sets—and hence, multicast groups—for each entity. Each node, in multicast usage, is in many different groups of small to medium size, and a group is defined as a set of receivers for multicast data. Senders do not have to belong to the group to send to it, and each node can receive data from a large set of distinct senders that can arrive from any of the groups it belongs to.

Data transmission using Internet Protocol (IP) multicast enables the system of the present invention, known herein as lateral error correction (LEC), to recover lost packets. Lateral error correction is an error correction mechanism in which XOR repair packets are probabilistically exchanged between receivers and across multicast groups. In the present invention, the latency of loss recovery in LEC depends inversely on the aggregate rate of data in the system, rather than the rate in any one group. The multicast protocol of the present invention performs equally well in any arbitrary configuration and cardinality of group overlap, which allows the protocol to scale to massive numbers of groups while retaining the best characteristics of state-of-the-art multicast technology: even distribution of responsibility among receivers, insensitivity to group size, stable proactive overhead and graceful degradation of performance in the face of increasing loss rates.

The LEC of the present invention is a reliability mechanism that allows packet recovery latency to be independent of per-group data rate by intelligently combining the repair traffic of multiple groups. The reliable multicast protocol of the present invention uses LEC to achieve massive scalability in the number of groups in the system. The system and method of the present invention can perform well with different loss rates, can tolerate bursty loss patterns, and are relatively insensitive to grouping patterns and overlaps, thus providing recovery characteristics that degrade gracefully with the number of groups in the system, as well as other conventional dimensions of scalability.

In the system and method of the present invention, each node has a multi-group view that can contain membership information about other nodes in the system with which each node shares at least one multicast groups. In traditional multicast group communication literature, a view is a list of members in a single multicast group. In contrast, a multi-group view of a node of the present invention divides the multicast groups to which the node belongs into a number of regions, and contains a list of members lying in each region. The system and method of the present invention use the multi-group view at a node to determine the sizes of regions and multicast groups in order to set up repair bins using the algorithm of the present invention. Also, the per-region lists in the multi-view are used to select destinations for repair packets. The multi-group view at each node, and consequently the multicast group and intersection sizes, do not include the node itself.

Referring now to FIG. 1, system 100 of the present invention can include, but is not limited to, setup subsystem 11 and packet processor 23, which together access and update framework parameters 29 either automatically or manually through operator 63. Framework parameters can include, but are not limited to, a number of repair packets c and at least one number d, both described later. Packet processor 23 receives communications packets 51 from, for example, node $n_1$ 41 and node $n_2$ 45 through communications network 35 and prepares and sends repair packets 53 to, for example, node $n_1$ 41 and node $n_2$ 45 through communications network 35. Node $n_1$ 41 and node $n_2$ 45 can be members of multicast group A 43 and multicast group B 49, the intersection of which is subset or region ab 47.

Figure 2:
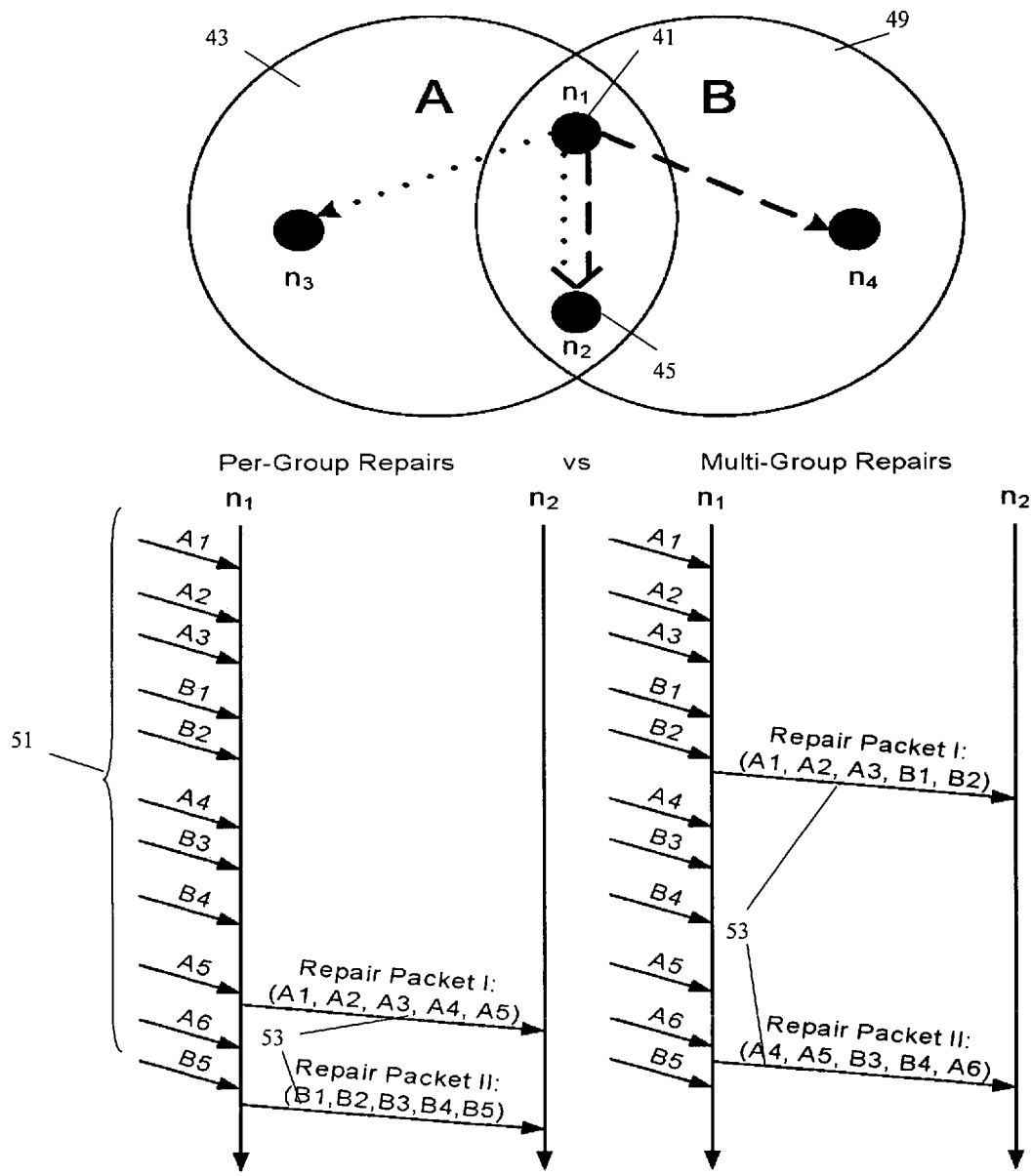
FIG. 2 is a schematic depiction of lateral error correction in two nodes.

Referring now primarily to FIG. 2, each node belongs to a number of groups, and receives data multicast within any of them. The basic operation of the error correction of the present invention involves generating XORs from incoming communications packets 51, and exchanging them with other randomly selected nodes. Two different packet types are used, communications packets 51, i.e. the actual data multicast within a multicast group, and repair packets 53, which contain recovery information for multiple communications packets 51.

Figure 3:
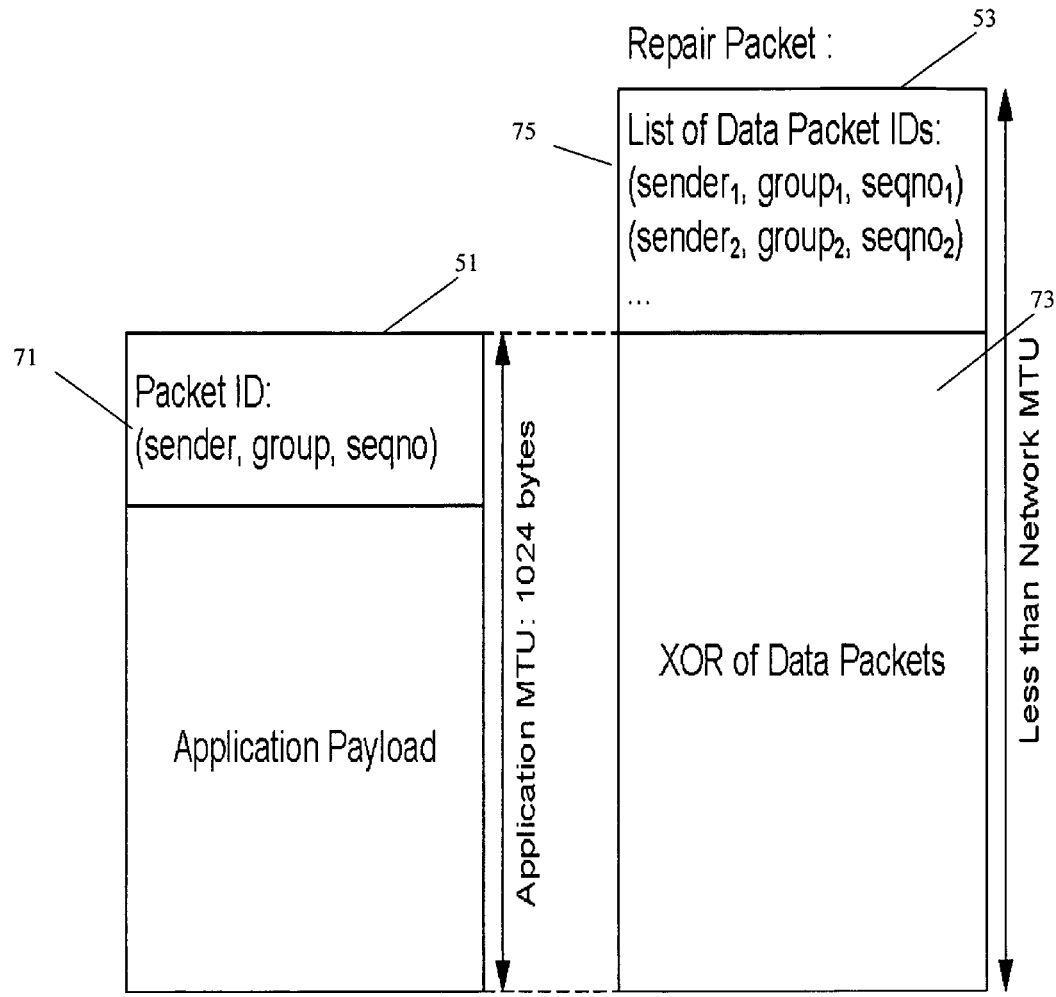
FIG. 3 is a diagram of an illustrative communication and repair packet structures of the present invention.

Referring now primarily to FIG. 3, the structure of communications packets 51 and repair packets 53 is shown. Each communications packet header contains a communications packet identifier 71 including, for example, a unique identifier such as a {sender, group, sequence number}-tuple. Repair packet 53 can contain an XOR 73 of multiple communications packets 51, along with a list 75 of their identifiers. Repair packet 53, composed from r communications packets 51, allows recovery of one communications packet 51, if all the other r–1 communications packets are available in repair packet 53. The missing communications packet 51 is obtained by computing the XOR of the payload of repair packet 53 with the communications packets 51 received by a node receiving repair packet 53. Each node determines the composition and destinations of repair packets 53, creating them from incoming communications packets 51 across multiple groups (FIG. 2). In the system and method of the present invention, repair packets 53 sent by, for example, node $n_1$ 41 to node $n_2$ 45, can be composed from data in any of the multicast groups that are common to them. This allows recovery of lost communications packets 51 at the receiving node of repair packet 53 to occur within time that's inversely proportional to the aggregate rate of data in all multicast groups.

Referring again to FIG. 2, node $n_1$ 41 has multicast group A 43 and multicast group B 49 in common with node $n_2$ 45, and hence node $n_1$ 41 can generate and dispatch repair packets 53 that contain data from both these multicast groups. In the example depicted in FIG. 2, node $n_1$ 41 needs to wait until it receives five communications packets destined for either multicast group A 43 or multicast group B 49 before node $n_1$ 41 sends repair packet 53, allowing faster recovery of lost packets at node $n_2$ 45.

Continuing to refer primarily to FIG. 2, while combining data from different multicast groups in outgoing repair packets 53 drives down recovery time, it tampers with the coherent tunability that single group receiver-based FEC provides. The rate-of-fire parameter in receiver-based FEC provides a clear, coherent relationship between overhead and recovery percentage; for every r communications packets 51, c repair packets 53 are generated in the system, resulting in some computable probability of recovering from packet loss. System 100 combines repair traffic for multiple multicast groups while retaining per-group overhead and recovery percentages, so that each individual multicast group can maintain its own rate-of-fire. To do this, in system 100, for every communications packet that node $n_1$ 41 receives in multicast group A 43 with rate-of-fire (r, c), node $n_1$ 41 sends out an average of c repair packets 53 including that communications packet 51 to other nodes in multicast group A 43. Further, system 100 picks destination nodes for repair packets 53 randomly, with no node $n_1$ 41 receiving more or less repair packets 53 than any other node, on average. System 100 supports overlapping multicast groups with the same r component and different c values in their rate-of-fire parameter. The rate-of-fire parameter is used to insure that, for every communications packet 51 that node $n_1$ 41 receives in multicast group A 43 having rate-of-fire (r, c), (1) an average of c nodes is selected from multicast group A 43 randomly and (2) each of these c nodes is sent exactly one repair packet 53 that includes communications packet 51. In other words, node $n_1$ 41 sends an average of c repair packets 53 containing communications packet 51 to multicast group A 43. Note that the protocol of system 100 is symmetric, i.e. the same algorithm and supporting code runs at each node of system 100 implements the algorithm of the present invention.

Figure 4:
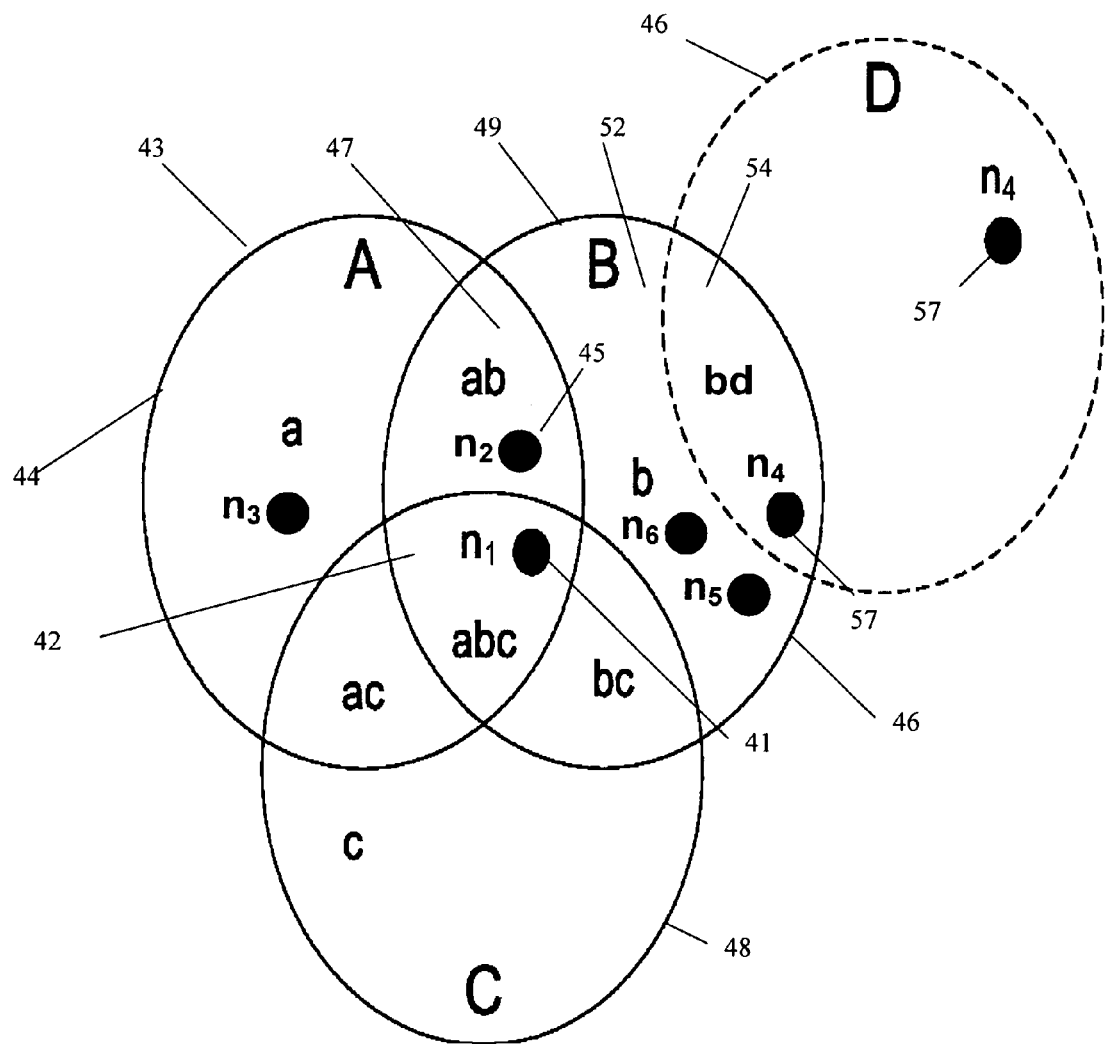
FIG. 4 is a schematic depiction of multicast groups and their respective regions as viewed from selected nodes.

Referring now primarily to FIG. 4, system 100 (FIG. 1), executing on node $n_1$ 41, divides node $n_1$'s 41 neighborhood, i.e. the set of nodes it shares at least one multicast groups with, into regions or subsets (these terms are used interchangeably throughout this specification), and uses this information to construct and disseminate repair packets 53. Regions are simply the disjoint intersections of all multicast groups to which node $n_1$ 41 belongs. In FIG. 4, node $n_1$ 41 is shown to be in multicast group A 43, multicast group B 49, and multicast group C 48. In FIG. 4, multicast groups are denoted by upper-case letters and regions are denoted by the concatenation of the group names in lowercase, i.e. region abc is formed from the intersection of multicast groups A, B and C. In FIG. 4, the neighborhood set of node $n_1$ 41 is carved into seven regions: abc, ac, ab, bc, a, b and c, essentially the power set of the set of multicast groups involved. Even though there are seven possible regions, it is the non-empty regions, the cardinality of which is bounded by the number of nodes in the system, that are considered by system 100. Note that node $n_1$ 41 does not belong to multicast group D 46 and is oblivious to it; node $n_1$ 41 observes node $n_2$ 45 as belonging to region b 52, rather than region bd 54, and is not aware of the existence of node $n_4$ 57.

Continuing to refer primarily to FIG. 4, system 100 (FIG. 1), instead of selecting targets for repairs randomly from multicast group A 43, selects targets randomly from each region. The number of targets selected from a region is set such that: (1) it is proportional to the size of the region, and (2) the total number of targets selected, across regions, is equal to the c value of the multicast group. Hence, for a given multicast group A 43 with rate of fire (r, $c_A$), the number of targets selected by system 100 in a particular region, for example, region abc 42, is equal to $c_A*|abc|/|A|$, where |x| is the number of nodes in the region or group x. The number of targets selected by system 100 in region abc 42 for repair packets 53 in group A is denoted as $c_A^{abc}$.

Figure 5:
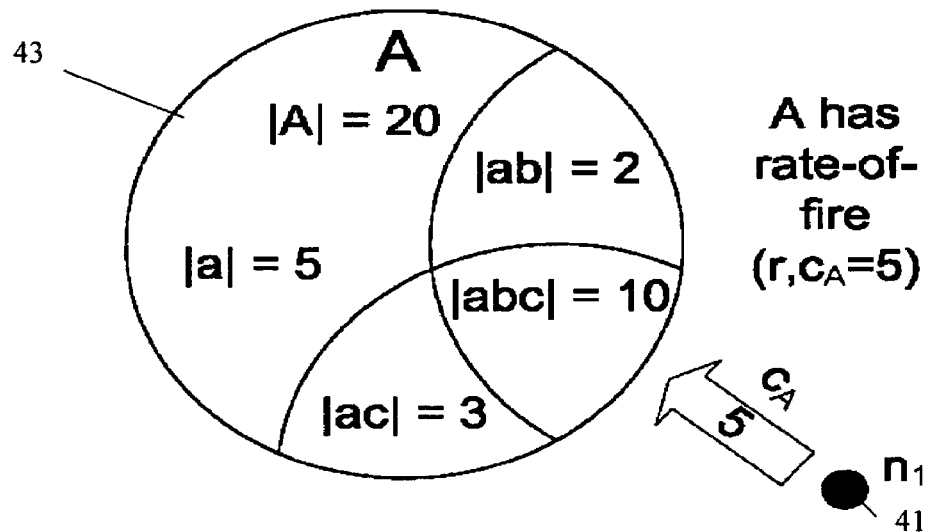
FIG. 5 is schematic depiction of regions or subsets and their framework parameters of a multicast group of the present invention.
Figure 5:
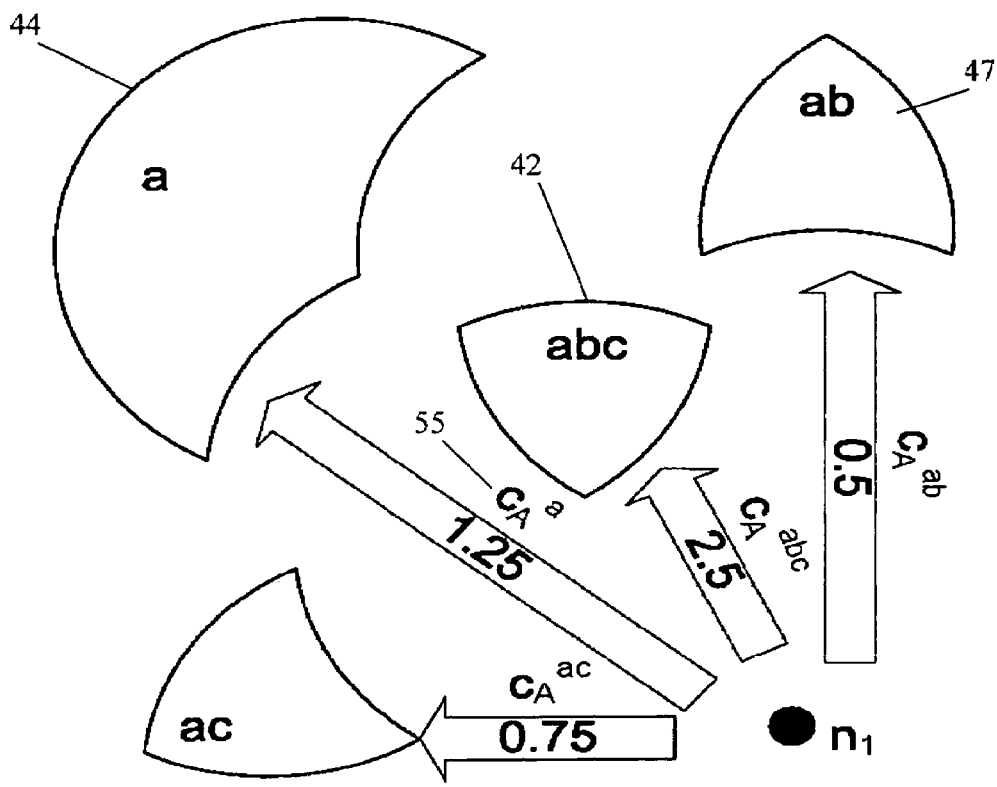

Referring now primarily to FIG. 5, node $n_1$ 41 is shown selecting targets for repair packets 53 (FIG. 1) from the regions of multicast group A 43. Note that system 100 (FIG. 1) may pick a different number of targets from a region for packets in a different group. For example, $c_A^{abc}$ differs from $c_B^{abc}$. Selecting targets in this manner can preserve randomness of selection. Target selection can also be viewed as a sampling problem, where a random sample of size c has to be selected from the group and selecting targets from regions corresponds to stratified sampling, an existing technique from statistical theory. Selecting targets from regions instead of groups allows system 100 to construct repair packets 53 from multiple groups. Since all nodes in region ab 47 are interested in data from multicast group A 43 and multicast group B 49 (FIG. 4), composite repair packets 53 can be created from incoming communications packets 51 in both multicast groups and can be sent to nodes in region ab 47.

Continuing to refer primarily to FIG. 5, system 100 (FIG. 1) can be implemented as a single-group receiver-based system using a repair bin, which collects incoming data within a multicast group. When a repair bin reaches a threshold size of r, repair packet 53 is generated from its contents and sent to c randomly selected nodes in the multicast group, after which the repair bin is cleared. Extending the repair bin construct to regions seems simple; a bin can be maintained for each region, collecting communications packets received in any of the multicast groups composing that region. When the bin fills up to size r, repair packet 53 containing data from all the multicast groups can be generated, and can be sent to targets selected from within the region. The minimum number of targets should be selected from region abc 42 (FIG. 4) for this repair packet 53, which results in a lower level of overhead for multicast group A 43 and multicast group B 49 than required, resulting in a lower fraction of communications packets 51 recovered from system 100. To rectify this, additional compensating repair packets 53 are sent to region abc 42 (FIG. 4) from the repair bins for region a 44 (FIG. 4) and region b 52 (FIG. 4). The repair bin for region a 44 would select $c_A^{abc} - c_C^{abc}$ destinations, on an average, for every repair packet 53 it generates. This is in addition to the $c_A^a$ destinations selected from region a.

Figure 6:
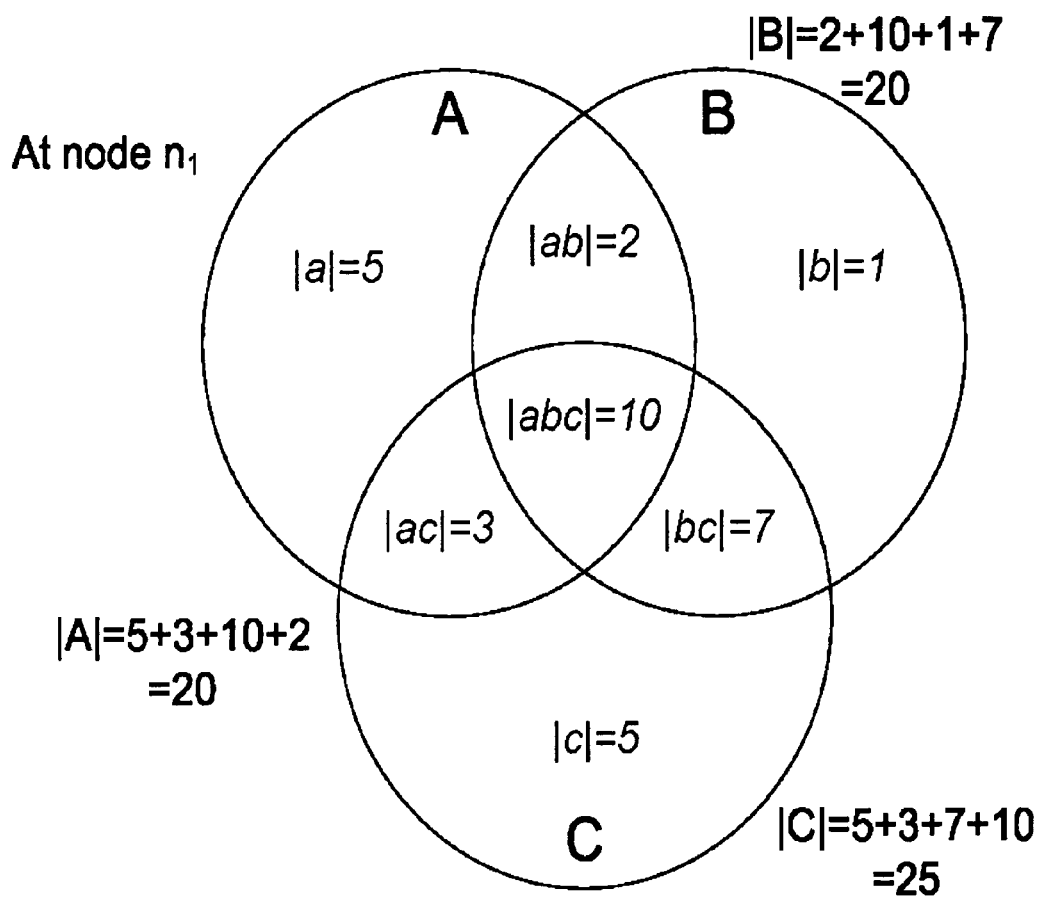
FIG. 6 is a schematic depiction of mappings between repair bins and regions.
Figure 6:
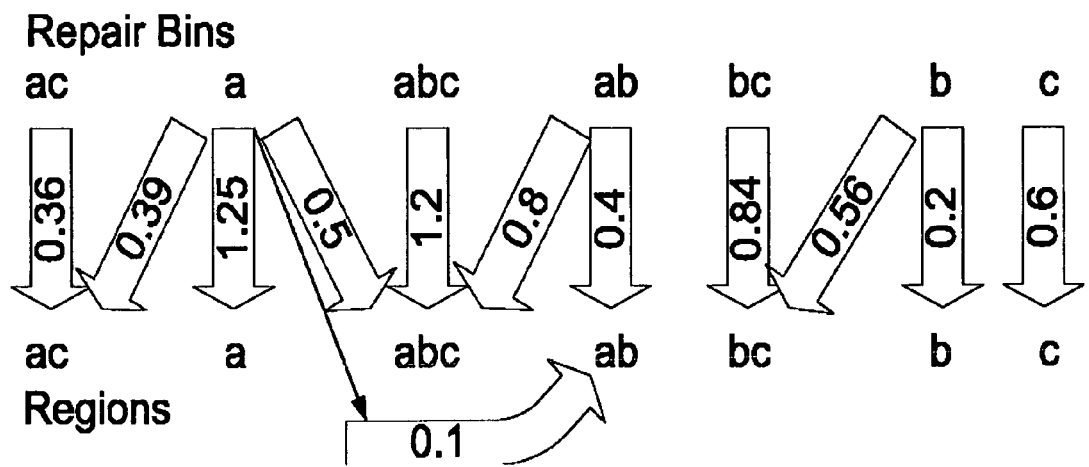

Referring now primarily to FIG. 6, Algorithm 1 (below) involves iteratively obtaining the required repair packets 53 (FIG. 1) from regions involving the remaining multicast groups; for example, system 100 (FIG. 1) would have the repair bin for region ab 47 (FIG. 4) select the minimum of $c_A^{abc}$ and $c_B^{abc}$, which happens to be $c_B^{abc}$, from region abc 42 (FIG. 4), and then have the repair bin for region a 44 (FIG. 4) select the remainder value, $c_A^{abc} - c_B^{abc}$, from region abc 42.

---

Algorithm 1 Algorithm for Setting Up Repair Bins

1: Code at node $n_i$:
2: upon Change in Group Membership do
3:   while L not empty     {L is the list of regions}
    do
4:     Select and remove the region $R_t$ = abc...z from L with highest number of groups involved (break ties in any order)
5:     Set $R_r = R_t$
6:     while $R_r \neq \epsilon$ do
7:       set $c_{min}$ to $\min(c_A^{Rt}, c_B^{Rt}...)$, where {A,B,...} is the set of groups forming $R_r$
8:       Set number of targets selected by $R_t$'s repair bin from region $R_r$ to $c_{min}$
9:       Remove G from $R_r$ for all groups G where $c_G^{Rt} = c_{min}$
10:      For each remaining group G' in $R_r$, set $c_{G'}^{Rt} = c_{G'}^{Rt} - c_{min}$

---

Continuing to refer primarily to FIG. 6, the output of Algorithm 1 for an example scenario is illustrated. Note that system 100 (FIG. 1) enables a repair bin to select a non-integral number of nodes from an intersection by alternating between its floor and ceiling probabilistically, in order to maintain the average at that number. Algorithm 1 described above can be run every time nodes join or leave any of the multicast groups that node $n_1$ 41 (FIG. 4) is part of. Algorithm 1 has complexity $O(I \square m)$, where I is the number of populated regions (i.e, with one or more nodes in them), and m is the maximum number of groups that form a region. Note that I at node $n_1$ 41 is bounded from above by the cardinality of the set of nodes that share a multicast group with node $n_1$ 41, since regions are disjoint and each node exists in exactly one of them. The maximum number of groups m is bounded by the number of groups to which node $n_1$ 41 belongs.

Continuing to still further refer to FIG. 6, in the illustrative embodiment, the repair bin of system 100 (FIG. 1) is a lightweight structure holding an XOR and a list of communications packets 51 (FIG. 1), and supporting an add operation that takes in communications packet 51 and includes it in the internal state of the repair bin. The repair bin is associated with a particular region, receiving all communications packets 51 incoming in any of the multicast groups forming that region. It has a list of regions from which it selects targets for repair packets 53 (FIG. 1); each of these regions is associated with a value, which is the average number of targets which must be selected from that region for an outgoing repair packet 53. In most cases, as shown in FIG. 6, the value associated with a region is not an integer; as stated previously, the repair bin alternates between the floor and the ceiling of the value to maintain the average at the value itself. In the example in FIG. 6, system 100 enables the repair bin for region abc 42 (FIG. 4) to select 1.2 targets from region abc 42, on average; hence, system 100 generates a random number between 0 and 1 for each outgoing repair packet 53, selecting 1 node if the random number is more than 0.2, and 2 nodes otherwise.

An alternate embodiment of system 100 (FIG. 1) can include Algorithm 1 that can further include staggering or interleaving, which can provide resilience to bursty losses. Given a sequence of communications packets 51 (FIG. 1) to encode, a stagger of 2 would entail constructing one repair packet 53 (FIG. 1) from the 1st, 3rd, 5th ... communications packets 51, and another repair packet 53 from the 2nd, 4th, 6th ... communications packets 51. The stagger value defines the number of repair packets 53 simultaneously being constructed, as well as the distance in the sequence between two communications packets 51 included in the same repair packet 53. Consequently, a stagger of i allows a loss burst of size i to be tolerated while resulting in a proportional slowdown in recovery latency, since repair packets 53 are dispatched only after awaiting $O(i*r)$ communications packets 51. In conventional sender-based FEC, staggering is not a very attractive option, providing tolerance to very small bursts at the cost of multiplying the already prohibitive loss discovery latency. However, system 100 can recover communications packets 51 so quickly that a slowdown of a factor of ten can be tolerated without leaving the tens of milliseconds range. Additionally, a small stagger at the sender allows very large bursts of lost communications packets 51 at the receiver to be tolerated, especially since the burst is dissipated among multiple groups and senders. System 100 can implement a stagger of i by duplicating each logical repair bin into i instances. When a communications packet 51 is added to the logical repair bin, it is actually added to a particular instance of the repair bin, chosen in round-robin fashion. Instances of a duplicated repair bin behave exactly as single repair bins do, generating repair packets 53 and sending them to regions when they get filled up.

In another alternate embodiment, system 100 (FIG. 1) can plug into existing membership and failure detection infrastructures that provide system 100 with reasonably up-to-date views of per-group membership by some external service, for example, conventional Group Membership (GMS) and conventional Failure Detection (FD) services, which typically execute on high-end server machines. If the GMS receives a notification from the FD that a node has failed, or it receives a join/leave to a group from a node, the GMS can typically sends a membership update to all nodes in the affected multicast group(s). The GMS is typically not aware of regions; it maintains conventional per-group lists of nodes, and sends per-group updates when membership changes. For example, if a node $n_x$ joins multicast group A, the membership update sent by the GMS to every node in A would typically be a 3-tuple: (Join, A, $n_x$). Individual system 100 nodes can process these membership updates to construct multi-group views relative to their own membership. Since the GMS typically does not maintain region data, the GMS typically has to scale only in the number of multicast groups in the system, which can be done by partitioning the GMS service by multicast group identification information and executing each partition on a different server. For instance, one computer could be responsible for multicast groups A and B, another computer for multicast groups C and D, and so on. Similarly, the FD can be partitioned on a topological criterion, i.e. one machine on each rack can be responsible for monitoring other nodes on the rack by pinging them periodically. For fault-tolerance, each partition of the GMS can be replicated on multiple machines using a strongly consistent protocol like Paxos. The FD can have a hierarchical structure to recover from failures; a smaller set of machines ping the per-rack failure detectors, and each other in a hierarchy. While this semi-centralized solution could be inappropriate in a high-churn environment, such as a Wide Area Network (WAN) or an ad-hoc setting, such a semi-centralized solution could be reasonable in datacenters, where membership is relatively stable. Crucially, the protocol of the present invention does not need consistent membership, and degrades gracefully with the degree of inconsistency in the views, i.e. if a failed node is included in a view, performance will dip fractionally in all the multicast groups to which the failed node belongs as repair packets sent to the failed node by other nodes are wasted.

Since system 100 (FIG. 1) creates repair information from each incoming communications packet 51 (FIG. 1), the critical communication path that a communications packet 51 follows within the protocol of system 100 determines, in part, eventual recovery times and the maximum sustainable throughput. XORs are computed in each repair bin incrementally, as communications packets 51 are added to the bin. Thus, in yet another alternate embodiment, the number of destinations to which repair packets 53 (FIG. 1) from the repair bin are sent, across all the regions to which repair packets 53 are sent can be pre-computed. Instead of constructing a repair bin and determining the number of destinations after the repair bin fills up, the number of destinations can be pre-computed and a repair packet 53 can be constructed only if the number of destinations is greater than 0. When the repair bin overflows and clears itself, the expected number of destinations for the next repair packet 53 can be generated. By pre-computing the number of destinations, the average number of two-input XORs per communications packet 51 can be restricted to c (from the rate-of-fire) in the worst case, a situation that occurs when no single repair bin selects more than one destination, and hence each outgoing repair packet 53 is a unique XOR.

In a still further alternate embodiment, when losses are in concentrated bursts, system 100 (FIG. 1) can maintain an application-level buffer to minimize in-kernel losses, serviced by a separate thread that continuously drains communications packets 51 (FIG. 1) from the kernel. This method can limit most loss bursts to less than ten packets, up to a threshold traffic burst size. If memory at end-hosts is constrained and the application-level buffer is bounded, customized packet-drop policies can be used to handle overflows, i.e. a randomly selected communications packet 51 from the buffer is dropped and the new communications packet 51 is accommodated instead. In practice, this results in a sequence of almost random losses from the buffer, which are easy to recover using system 100. Whether the application-level buffer is bounded or not, use of a buffer can insure that packet losses in the kernel are reduced to short bursts that occur only during periods of overload or CPU contention.

System 100 (FIG. 1) can recover a high percentage of lost packets and, for certain applications, this probabilistic guarantee of packet recovery is sufficient and even desirable in cases where data "expire" and there is no utility in recovering it after a certain number of milliseconds. However, the majority of applications require 100% recovery of lost data, and in yet another alternative embodiment, system 100 can use a reactive NAK layer to provide this guarantee. If a receiver does not recover a communications packet 51 through system 100 as previously described within a timeout period after discovery of loss, the receiver can send an explicit NAK to the sender and request a retransmission. While this NAK layer does result in extra reactive repair traffic, two factors separate it from traditional NAK mechanisms: firstly, recovery can potentially occur very quickly—within a few hundred milliseconds—since for almost all lost communications packets 51 discovery of loss takes place within milliseconds through system 100. Secondly, the NAK layer is meant solely as a backup mechanism and responsible for recovering a very small percentage of total loss, and hence the extra overhead is likely to be minimal.

In yet another alternative embodiment, system 100 (FIG. 1) can maintain a buffer of unusable repair packets 53 (FIG. 1) that enable it to utilize incoming repair packets 53 better. In this embodiment, if one repair packet 53 is missing exactly one more communications packet 51 (FIG. 1) than another repair packet 53, and both are missing at least one communications packet 51, system 100 can obtain the extra communications packet 51 by XORing the two repair packets 53. Also, system 100 can maintain a list of unusable repair packets 53 which is checked intermittently to see if recent communications packet 51 recoveries and receives have made any old repair packets 53 usable.

Figure 7:
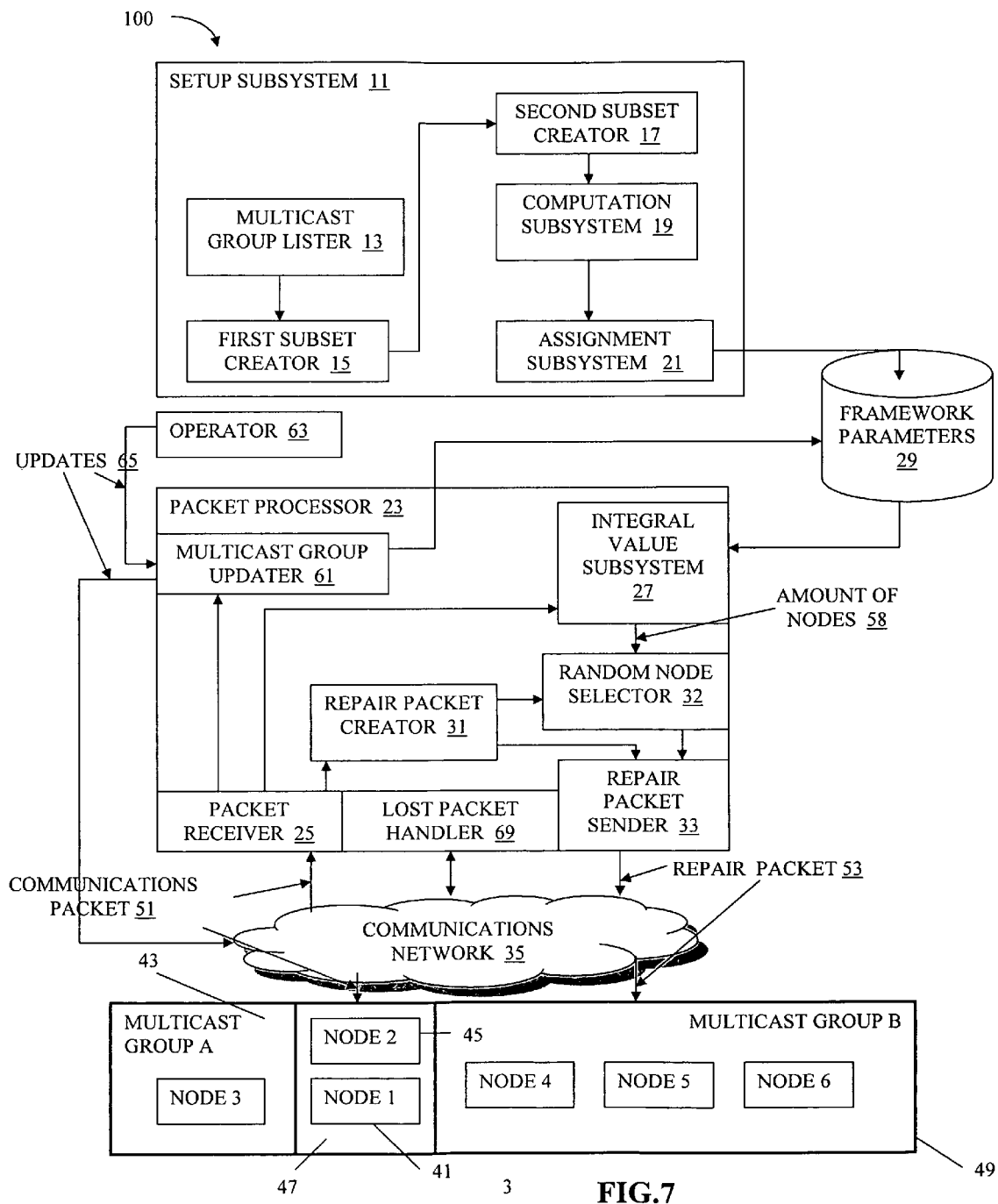
FIG. 7 is a schematic block diagram of the subsystems of the present invention.

Referring now primarily to FIG. 7, an illustrative embodiment of setup subsystem 11 can include, but is not limited to, multicast group lister 13, first subset creator 15, second subset creator 17, computation subsystem 19, and assignment subsystem 21. An illustrative embodiment of packet processor 23 can include, but is not limited to, multicast group updater 61, integral value subsystem 27, repair packet creator 31, random node selector 32, packet receiver 25, lost packet handler 69, and repair packet sender 33. Setup subsystem 11 can determine framework parameters 29 associated with, for example, node $n_1$ 41 that is a member of, for example, multicast group A 43. Packet processor 23 can receive communications packet 51, addressed to, for example, multicast group A 43, into, for example, node $n_1$ 41. Repair packet creator 31 can prepare repair packet 53 that can include communications packet 51, while integral value subsystem 27 can use framework parameters 29 for selecting amount of nodes 58 to which repair packet 53 is sent. Random node selector 32 can randomly select amount of nodes 58 from multicast group A 43 to which repair packet 53 is sent. Repair packet sender 33 can send repair packet 53 to the randomly selected amount of nodes 58.

Continuing to refer to FIG. 7, multicast group lister 13 can determine a multicast group, for example multicast group A 43, to which a selected node, for example node $n_1$ 41 belongs, where the multicast group can have a group number of nodes, for example, in the case of multicast group A 43, three nodes. First subset creator 15 can determine a first subset of nodes, that can include nodes in communications network 35 that share at least one multicast group with the selected node. Second subset creator 17 that can determine at least one second subset, for example second subset ab 47 having a subset number of nodes, for example two nodes, that includes the selected node, for example node $n_1$ 41, and nodes from the first subset, that have a same set of nodes in common with the selected node, for example node $n_2$ 45. Computation subsystem 19 can compute a number c of repair packets 53 sent per communications packets 51 received for the multicast group, for example, for multicast group A 43, $c_A{}^a$ 55=1.25. Computation subsystem 19 can also compute at least one number d corresponding to the second subset, for example, second subset ab 47, that is based on (1) the number c, (2) the subset number of nodes in the second subset, for example two nodes, and (3) the group number of nodes in the multicast group, for example three nodes. Assignment subsystem 21 can assign the at least one number d to each of the second subsets.

Continuing to still further refer to FIG. 7, packet processor 23 can include, but is not limited to, multicast group updater 61 that can receive membership updates 65 to the multicast group, can send the membership updates 65 to nodes in the multicast group, and can update the first subset based on the received membership updates 65. Packet processor 34 can further include integral value subsystem 27 that can compute, for each of the second subsets, an integral value that is either greater or smaller than a selected one of the at least one number d, and that is the average of the integral values computed for the received communications packets 51. Packet processor 34 can still further include random node selector 32 that can randomly select a number of nodes from the second subset that is equal to the integral number. Packet processor 34 can even still further include lost packet handler 69 can set a timeout period after discovery of a lost communications packet at the selected node and send a negative acknowledgement to a sender of the lost communications packet if the timeout period expires. Lost packet handler 69 can also request a retransmission from said sender of said lost communications packet.

Continuing to still further refer to FIG. 7, packet processor 23 can also include packet receiver 25 that can receive communications packets 51 from nodes of the second subset. In conjunction with packet receiver 25, repair packet creator 31 can prepare contents of a repair bin associated with the second subset by XORing the communications packets 51 with each other, and can prepare repair packet 53 from the contents of the repair bin. Repair packet creator 31 can also precompute a number of nodes to which repair packet 53 is sent from the repair bin, and can construct repair packet 53 only if the number of nodes is greater than zero. Repair packet creator 31 can also select communications packet 51 and direct it to a repair bin, and then discard communications packet 51 in order to accommodate another communications packet. Packet receiver 25 can also receive communications packets 51 from nodes in the second subset, and repair packet creator 31 can prepare contents of the repair bin associated with the second subset by XORing a selection of communications packets 51 with each other. Repair packet creator 31 can construct repair packet 53 from the contents of the repair bin. In order to implement stagger, the selection of communications packets 51 can be every other communications packet 51. Repair packet creator 31 can XOR two of the repair packets 53 to recover communications packet 51 if one of repair packets 53 is missing exactly one more communications packet 51 than another repair packet 53.

Figure 8:
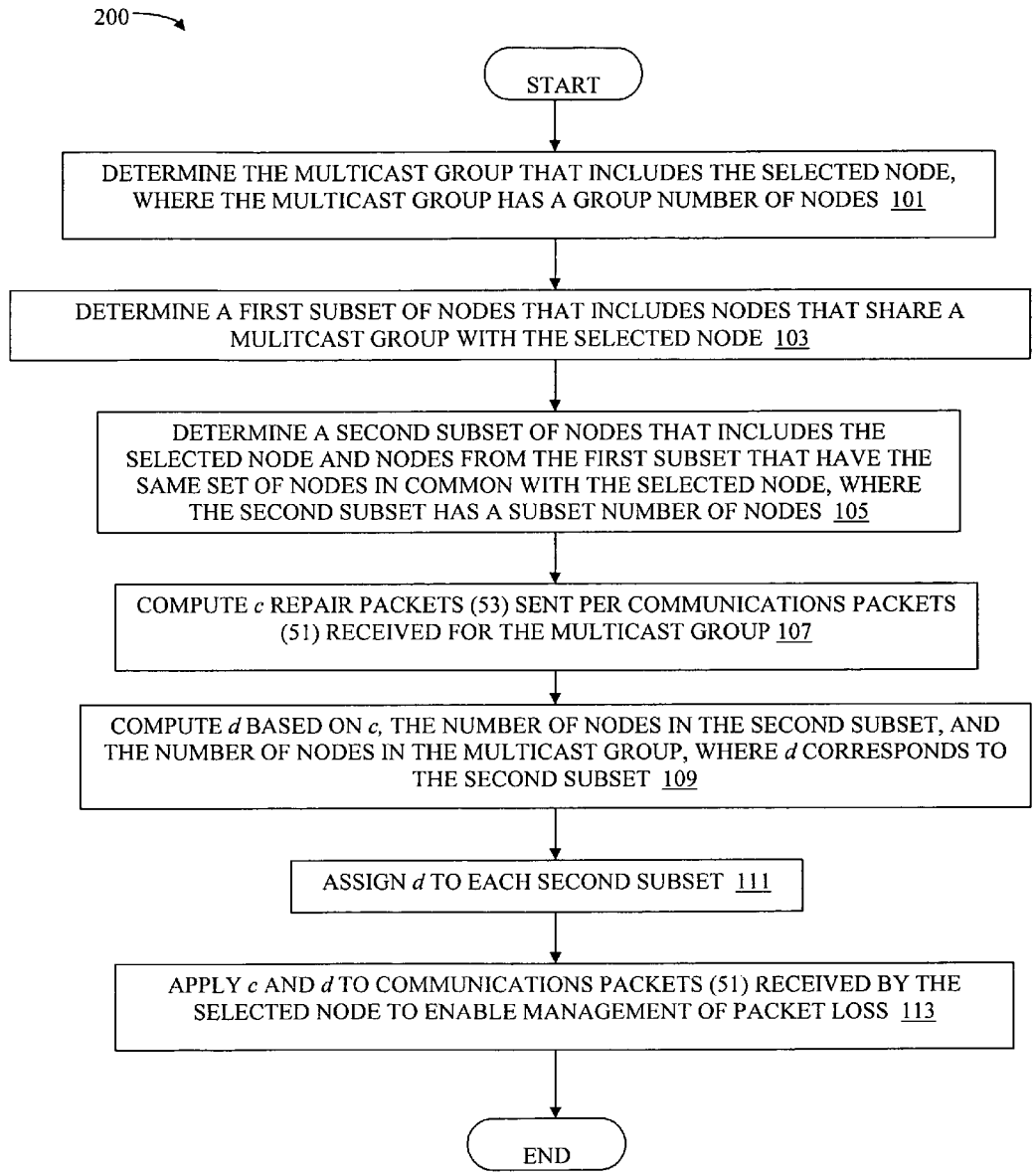
FIG. 8 is a flowchart of the method of one embodiment of the present invention.

Referring now primarily to FIG. 8, method 200 for determining framework parameters 29 associated with a selected node that is a member of at least one multicast group, where framework parameters 29 (FIG. 1) enable management of packet loss in communications network 35 (FIG. 1), can include, but is not limited to, the steps of determining 101 the multicast group having a group number of nodes to which the selected node belongs, determining 103 a first subset of nodes that includes nodes in communications network 35 that share at least one multicast group with the selected node, and determining 105 a second subset that has a subset number of nodes where the number includes the selected node and nodes from the first subset that have the same set of nodes in common with the selected node. Method 200 can further include the steps of computing 107 a number c of repair packets 53 (FIG. 1) sent per communications packets 51 (FIG. 1) received for the multicast group, and computing 109 at least one number d, corresponding to the second subset, based at least on (1) the number c, (2) the subset number of nodes in the second subset, and (3) the group number of nodes in the multicast group. Method 200 can still further include the steps of assigning 111 the at least one number d to each of the second subsets, and applying 113 the numbers c and d to communications packets 51 (FIG. 1) received by the selected node to enable management of packet loss at the selected node, and thus, throughout communications network 35. Method 200 can optionally include the steps of receiving membership updates 65 (FIG. 2) to the multicast group, sending the membership updates 65 to nodes in the multicast group, and updating the first subset based on the received membership updates 65.

Figure 9:
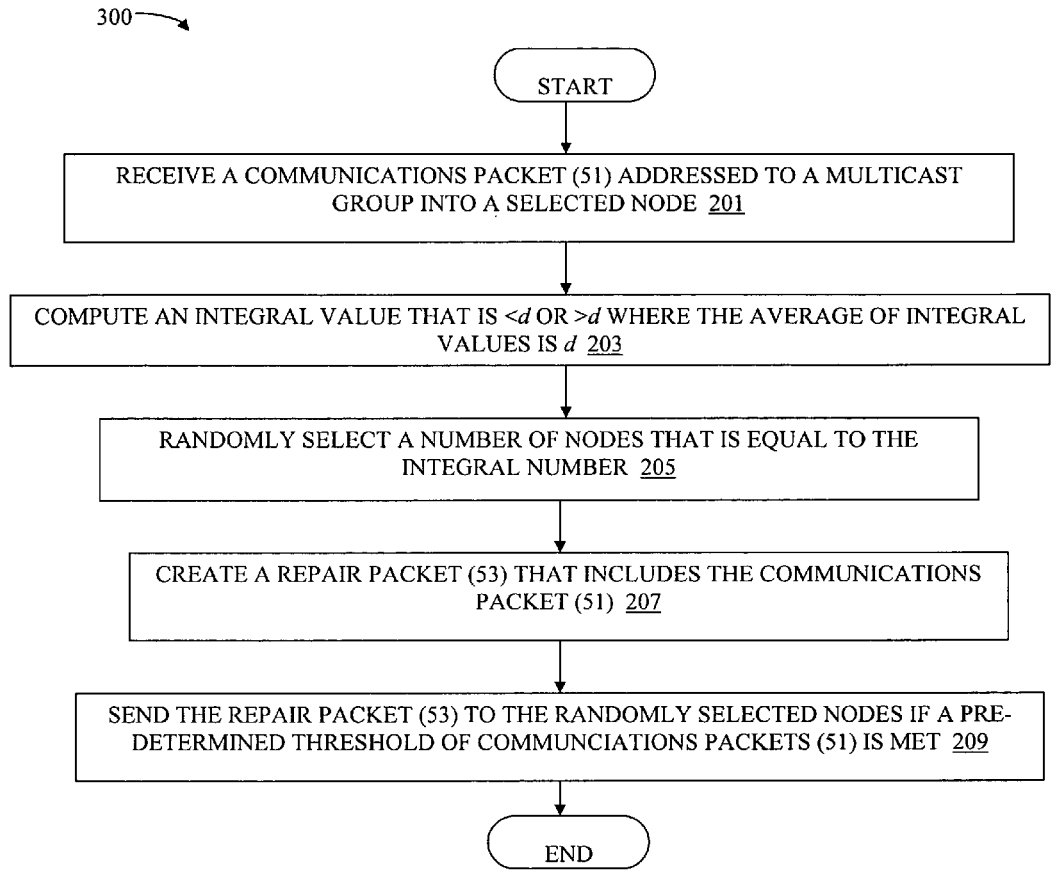
FIG. 9 is a flowchart of the method of a second embodiment of the present invention.

Referring now primarily to FIG. 9, method 300 for processing communications packets 51 (FIG. 1) within an established framework for managing packet loss in communications network 35 (FIG. 1), where the established framework includes a number of repair packets c, at least one number d, and a second subset of nodes, can include, but is not limited to, the steps of receiving 201, into a selected node, a communications packet 51 that is addressed to a multicast group, computing 203 for each of the second subsets an integral value that is either greater or smaller than a selected one of the at least one number d, so that an average of the integral values computed for the received communications packets 51 is the at least one number d, randomly selecting 205 a number of nodes equal to the integral number from the second subset, creating 207 a repair packet 53 (FIG. 1) that includes the communications packet 51, and sending 209 the repair packet 53 to the randomly selected nodes.

Method 300 can optionally include the steps of setting a timeout period after discovery of a lost communications packet 51 (FIG. 1) at the selected node, sending a negative acknowledgement to a sender of the lost communications packet 51 if the timeout period expires, and requesting a retransmission from the sender of the lost communications packet 51. Method 300 can further optionally include the steps of receiving communications packets 51 from nodes of the second subset, preparing contents of a repair bin associated with the second subset by XORing the communications packets 51 with each other, and preparing a repair packet 53 (FIG. 1) from the contents of the repair bin. Method 300 can still further optionally include the steps of pre-computing a number of nodes to which the repair packet 53 is sent from the repair bin, and constructing the repair packet 53 only if the number of nodes is greater than 0.

Method 300 can even still further include the optional steps of selecting a communications packet 51 (FIG. 1) destined for the repair bin, and discarding the communications packet 51 in order to accommodate another communications packet 51. Method 300 can still further optionally include the steps of receiving communications packets 51 from nodes in the second subset, preparing contents of the repair bin associated with the second subset by XORing a selection of communications packets 51 with each other, preparing a repair packet 53 (FIG. 1) from the contents of the repair bin, and selecting every other communications packet 51 for XORing. Method 300 can further include the optional step of XORing two of the repair packets 53 to recover a communications packet 51 if one of the repair packets 53 is missing exactly one more communications packet 51 than another repair packet 53.

Methods 200 and 300 (FIGS. 8 and 9) can be, in whole or in part, implemented electronically. Signals representing actions taken by elements of the system can travel over electronic communications media and from node to node in communications network 35 (FIG. 1). Control and data information can be electronically executed and stored on computer-readable media 37 (FIG. 1). Methods 200 and 300 can be implemented to execute on a node in computer communications network 35. Common forms of computer-readable media 37 include, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, or any other medium from which a computer can read.

Although the invention has been described with respect to various embodiments, it should be realized this invention is also capable of a wide variety of further and other embodiments.

What is claimed is:

1. A method for enabling management of packet loss in a communications network, said method comprising the steps of:
   determining all at least one multicast group to which a selected node belongs, each of the at least one multicast group having a group number of nodes;
   determining a first subset of nodes that includes nodes in the communications network that are members of at least one of the at least one multicast group to which the selected node belongs;
   determining at least one second subset having a subset number of nodes, wherein the at least one second subset includes the selected node and nodes from the first subset that share all the at least one multicast group with each other;
   determining a number of repair packets sent per communications packets received for the at least one multicast group;
   computing at least one representative number corresponding to the at least one second subset;
   assigning the at least one representative number to each of the at least one second subsets; and
   preparing and sending repair packets based on the number of repair packets, the at least one representative number, and the communications packets received by the selected node to enable management of packet loss.

2. The method as in claim 1 wherein the at least one representative number is based upon the number of repair packets.

3. The method as in claim 1 wherein the at least one representative number is based upon the number of nodes in the at least one second subset.

4. The method as in claim 1 wherein the at least one representative number is based upon the group number of nodes in the at least one multicast group.

5. The method of claim 1 further comprising the step of:
   receiving membership updates to the at least one multicast group;
   sending the membership updates to nodes in the at least one multicast group; and
   updating the at least one second subset based on the received membership updates.

6. A computer readable medium having instructions embodied therein for the practice of the method of claim 1.

7. A method for processing communications packets within an established framework for managing packet loss in a communications network, the established framework including a number of repair packets, at least one representative number, and at least one second subset of nodes, said method comprising the steps of:
   receiving a communications packet into a selected node, the communications packet being addressed to at least one multicast group;
   computing, for each of the at least one second subsets, an integral value that is either greater or smaller than the at least one representative number, wherein an average of the integral values computed for a plurality of the communications packets is the at least one representative number;
   randomly selecting a number, equal to the integral value, of nodes from the at least one second subset;
   creating a repair packet that includes the communications packet; and
   sending the repair packet to the randomly selected nodes.

8. The method of claim 7 further comprising the steps of:
   setting a timeout period after discovery of a lost communications packet at the selected node;
   sending a negative acknowledgement to a sender of the lost communications packet if the timeout period expires; and
   requesting a retransmission from the sender of the lost communications packet.

9. The method of claim 7 further comprising the steps of:
   receiving communications packets from nodes of the at least one second subset;
   preparing contents of at least one repair bin associated with the at least one multicast group, the at least one repair bin including the communications packets arriving from the at least one multicast group; and
   preparing the repair packet from the contents of the at least one repair bin by XORing the communications packets of the repair bin with each other.

10. The method of claim 9 further comprising the steps of:
    precomputing a number of receiving nodes to which the repair packet is sent from the at least one repair bin;
    constructing the at least one repair packet only if the number of receiving nodes is greater than 0 and if the at least one repair bin has accumulated a pre-determined threshold number of communications packets;
    sending the repair packet to the receiving nodes; and
    emptying the at least one repair bin.

11. The method of claim 9 further comprising the steps of:
selecting the communications packet destined for the at least one repair bin; and
discarding the communications packet in order to accommodate another communications packet.

12. The method of claim 7 further comprising the steps of:
receiving the communications packets destined for nodes in any of the at least one multicast group to which any node in the at least one second subset belongs;
preparing contents of at least one repair bin by XORing a selection of the received communications packets with each other; and
preparing the repair packet from the contents of the at least one repair bin.

13. The method of claim 12 further comprising the step of:
selecting every other communications packet for XORing.

14. The method of claim 7 further comprising the steps of:
XORing two of the repair packets to recover the communications packet if one of the two repair packets is missing exactly one more communications packet than the other of the two repair packets.

15. A system for managing communications packet loss in a communications network comprising:
a setup subsystem capable of determining framework parameters associated with a selected node that is a member of at least one multicast group;
a packet processor capable of receiving said communications packet into said selected node, said communications packet being addressed to said at least one multicast group;
a repair packet creator capable of preparing a repair packet that includes said communications packet;
an integral value subsystem capable of using said framework parameters for selecting an amount of nodes to which said repair packet is sent;
a random node selector capable of randomly selecting said amount of nodes from said at least one multicast group to which said repair packet is sent; and
a repair packet sender capable of sending said repair packet to said randomly selected amount of nodes.

16. The system of claim 15 wherein said setup subsystem further comprises:
a multicast group lister capable of determining said at least one multicast group having a group number of nodes to which said selected node belongs;
a first subset creator capable of determining a first subset of nodes that includes nodes in a communications network that share said at least one multicast group with said selected node;
a second subset determining at least one second subset having a subset number of nodes that includes said selected node and nodes from said first subset that have a same set of nodes in common with said selected node;
a computation subsystem capable of computing a number of said repair packets sent per communications packets received for said at least one multicast group, said computation subsystem capable of computing at least one number corresponding to said at least one second subset, wherein said at least one number is based at least on (a) said number of said repair packets, (b) said subset number of nodes in said at least one second subset, and (c) said group number of nodes in said at least one multicast group;
an assignment subsystem capable of assigning said at least one number to each of said at least one second subsets.

17. The system of claim 16 further comprising:
a packet receiver capable of receiving said communications packets from nodes in said at least one second subset.

18. The system of claim 15 wherein said packet processor further comprises:
a multicast group updater capable of receiving membership updates to said at least one multicast group, wherein said multicast group updater is capable of sending said membership updates to nodes in said at least one multicast group, and wherein said multicast group updater is capable of updating said first subset based on said received membership updates;
an integral value subsystem capable of computing, for each of said at least one second subsets, an integral value that is either greater or smaller than said at least one number, wherein an average of said integral values computed for a plurality of said communications packets is said at least one number; and
a random node selector capable of randomly selecting a number of nodes from said at least one second subset, wherein said number of nodes is equal to said integral value.

19. The system of claim 15 further comprising:
a lost packet handler capable of setting a timeout period after discovery of a lost communications packet at said selected node;
wherein said lost packet handler is capable of sending a negative acknowledgement to a sender of said lost communications packet if said timeout period expires;
wherein said lost packet handler is capable of requesting a retransmission from said sender of said lost communications packet.

20. The system of claim 15 further wherein said repair packet creator is capable of precomputing a number of nodes to which said repair packet is sent from at least one repair bin;
wherein said repair packet creator is capable of constructing said at least one repair packet only if said subset number of nodes is greater than zero and if said at least one repair bin includes a pre-determined threshold number of said communications packets;
wherein said repair packet creator is capable of preparing contents of said at least one repair bin associated with said at least one second subset by XORing a selection of said communications packets with each other; and
wherein said repair packet creator is capable of constructing said at least one repair packet from said contents of said at least one repair bin.

21. The system of claim 20 wherein said selection of said communications packets is every other communications packet.

22. The system of claim 15 wherein said repair packet creator is capable of selecting a communications packet destined for said at least one repair bin;
wherein said repair packet creator is capable of discarding said communications packet in order to accommodate a different communications packet.

23. The system of claim 15 wherein said repair packet creator is capable of XORing two of said repair packets to recover said communications packet if one of said repair packets is missing exactly one more said communications packet than a different said repair packet.

* * * * *